(No Model.)

W. F. COLLINS.
ELECTRIC MOTOR OR DYNAMO ELECTRIC MACHINE.

No. 451,894. Patented May 5, 1891.

Witnesses
C. E. Ashley
M. C. Butler

Inventor
Wm. F. Collins
By his Attorney
Charles J. Kimmer

UNITED STATES PATENT OFFICE.

WILLIAM F. COLLINS, OF CHICAGO, ILLINOIS, ASSIGNOR, BY MESNE ASSIGNMENTS, TO THE CROCKER-WHEELER ELECTRIC MOTOR COMPANY, OF NEW YORK, N. Y.

ELECTRIC MOTOR OR DYNAMO-ELECTRIC MACHINE.

SPECIFICATION forming part of Letters Patent No. 451,894, dated May 5, 1891.

Original application filed April 17, 1888, Serial No. 270,982. Divided and this application filed March 2, 1891. Serial No. 383,341.

(No model.)

*To all whom it may concern:*

Be it known that I, WILLIAM F. COLLINS, a subject of the Queen of Great Britain, residing at Chicago, in the county of Cook and State of Illinois, have made a new and useful Invention in Electric Motors or Dynamo-Electric Machines, of which the following is a specification.

My invention is directed particularly to improvements in armatures of this type of apparatus, and the present application is a division of an application for a patent filed by me in the United States Patent Office on the 17th day of April, 1888, bearing Serial No. 270,982; and it has for its objects, first, the construction of an armature which shall present to the magnetic circuit between it and the field-magnet cores a minimum amount of magnetic resistance; second, the production of an armature which shall maintain the conductors in its face in position and avoid as far as possible the evil effects of centrifugal force in its rotation. These objects are accomplished by the use of the apparatus hereinafter described, but particularly pointed out in the claim which follows this specification.

My invention will be fully understood by referring to the accompanying drawings, in which—

Figure 1:
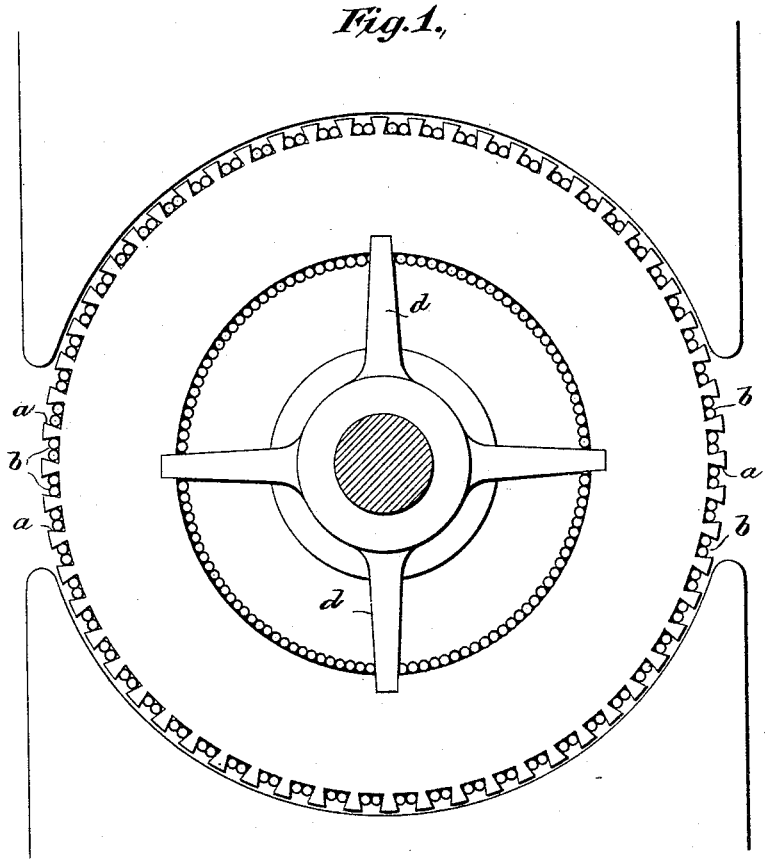
Figure 2:
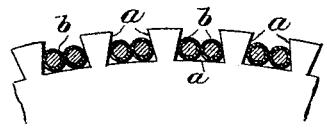

Figure 1 is a cross-sectional view of an armature of the Gramme or ring type constructed in accordance with my improvement. Fig. 2 is an enlarged detail view showing the relation of the windings to the slots.

The armature-core is made of laminated magnetic disks having trapezoidal slots $a$ at the outer edge, said slots being of greater width at the bottom than at the exterior edge, so that the conductors $b$ may be wound through the slots in the outer face of the core and on the inner side, as clearly shown in Fig. 1. These laminated disks are laid side by side, so that the slots are in direct alignment with each other, thus forming trapezoidal grooves extending across the face of the armature. When the disks are placed side by side, so that the trapezoidal grooves or slots are formed, the bolt-holes are also in direct alignment, bolts being provided for holding the disks together. The windings of the conductors $b$ are passed successively through the slots and the inner portion of the ring, the greater number of layers being located in the base of the grooves or slots, as will be clearly understood on examination of Fig. 1. The armature-core is sustained by spiders $d$ or in any other preferred manner.

It will be understood, of course, that there may be any number of windings, and that the trapezoidal slots may be of any desired dimensions, and also that said slots may be applied to any other type of armature, my invention being directed, broadly, to the use of trapezoidal slots on the face of an armature-core, in which the windings of the conductors are located, thereby giving increased magnetic conductivity to the armature-core and increased security against the evil effects of centrifugal force due to the armature's rotation.

Having thus described my invention, what I claim, and desire to secure by Letters Patent of the United States, is—

An armature-core for an electric motor or dynamo-electric machine formed with trapezoidal slots in its periphery of greater width at the bottom than at the top, the windings or conductors being contained in the slots, substantially as described.

WILLIAM F. COLLINS.

Witnesses:
CHARLES J. KINTNER,
FRANCIS B. CROCKER.